United States Patent [19]

Morikawa

[11] Patent Number: 4,756,069
[45] Date of Patent: Jul. 12, 1988

[54] METHOD OF MAKING A TANK
[75] Inventor: Hiroaki Morikawa, Kanda, Japan
[73] Assignee: Nissan Motor Company, Limited, Kanagawa, Japan
[21] Appl. No.: 902,134
[22] Filed: Sep. 2, 1986

Related U.S. Application Data

[63] Continuation of Ser. No. 755,539, Jul. 15, 1985, abandoned, which is a continuation of Ser. No. 496,535, May 20, 1983, abandoned.

[30] Foreign Application Priority Data

Jun. 4, 1982 [JP] Japan ................................ 57-94720

[51] Int. Cl.⁴ ............................................ B21D 39/02
[52] U.S. Cl. ................................... 29/463; 228/135
[58] Field of Search ................. 29/463, 464; 228/135; 220/5 R, 5 A, 4 R, 4 B, 76, 4 E

[56] References Cited

U.S. PATENT DOCUMENTS

| | | | |
|---|---|---|---|
| 544,082 | 8/1895 | Beecher | 228/135 |
| 1,417,617 | 5/1922 | McNeil | 220/76 |
| 1,806,508 | 5/1931 | Smith | 228/135 |
| 1,866,979 | 7/1932 | Lerio | 220/5 R |
| 2,012,889 | 8/1935 | McIntyre | 228/135 |
| 2,806,622 | 9/1957 | Leirer | 220/5 A |
| 2,920,682 | 1/1960 | Linderg | 29/464 |
| 3,453,715 | 7/1969 | Rogers | 29/463 |
| 3,473,687 | 10/1969 | Larsen | 220/5 A |

FOREIGN PATENT DOCUMENTS 137454 10/1979 Japan ................................ 228/135

Primary Examiner—Timothy V. Eley

[57] ABSTRACT

A tank has an upper shell and a lower shell. The shells have flanges at their periphery which are seam-welded to form a tank. A plurality of projections formed on the flange of the upper shell and a plurality of recesses formed on the flange of the lower shell fit together thereby to prevent the flanges from displacing each other when they are seam-welded. Also, a method for making the tank is disclosed.

3 Claims, 4 Drawing Sheets

METHOD OF MAKING A TANK

This application is a continuation of Ser. No. 755,539 filed July 15, 1985 now abandoned which is a continuation of application Ser. No. 496,535 filed May 20, 1983, now abandoned.

BACKGROUND OF THE INVENTION

This invention relates to a tank and a method for making the tank.

FIGS. 1 through 4 show a conventional tank and a conventional machine for making such a tank. An upper shell 1 of a tank has a flange 1a. A lower shell 2 also has a flange 2a. The flange 1a of the upper shell 1 and the flange 2a of the lower shell 2 must be matched when they are seam-welded at the whole periphery thereof. In practice, the flanges 1a and 2a are provisionally spot-welded at a selected portion thereof as shown by the numeral 3 in FIG. 2 in order to avoid the displacement of the flanges 1a and 2a. After the flanges 1a and 2a are spot-welded to form a tank W, the upper shell 1 and the lower shell 2 are together set in a work receiver 6 of a seam welding machine 5 (FIG. 3).

As shown in FIG. 3, the work receiver 6 is fixed to a profiling cam 9 which in turn is rotatably supported by a shaft 8 of a holding frame 7 (FIG. 4). An upper pad 10 is also attached to the holding frame 7 in coaxial relation to the shaft 8. The tank W is rotatably pressed by the upper pad 10 toward the work receiver 6. A roller 11 is rotatable and positioned always at the same place. The profiling cam 9 is pressed between a guide plate 12 and the roller 11. A pair of roller electrodes 13 press therebetween the flanges 1a and 2a of the tank W as shown in FIG. 3 so as to weld the flanges 1a and 2a. The roller electrodes 13 are driven by a pair of driving members 14.

The outer profile of the profiling cam 9 exactly corresponds to the seam-welding locus of the flanges 1a, 2a.

A contact point between the profiling cam 9 and the guide plate 12 is positioned in a straight line X (FIG. 4) which passes the center of the roller electrodes 13.

In operation, the roller electrodes 13 are driven by the driving members 14 so that the flanges 1a and 2a of the tank W pressed between the pair of roller electrodes 13 are welded to each other at a pressing point of the roller electrodes 13. For instance, if the flanges 1a and 2a are fed in the direction of the arrow A, the profiling cam 9 moves in the same direction because the work receiver 6 supporting the tank W is fixed to the profiling cam 9. The movement of the profiling cam 9 is controlled by the roller 11 and the guide plate 12. Therefore, the locus of the welded portion or the seam welding line of the flanges 1a and 2a follows the cam shape of the profiling cam 9 by way of the work receiver 6.

The holding frame 7 can move laterally in response to the movement of the profiling cam 9 together with the tank W, the work receiver 6 and the profiling cam 9 supported thereby between the shaft 8 and the upper pad 10.

However, in such conventional tanks as above-mentioned, before the flange 1a of the upper shell 1 is matched with the flange 2a of the lower shell 2 for the seam welding purpose, some part of the flanges 1a and 2a must be spot-welded in order to avoid the displacement thereof. In other words, a spot welding step must be added to a seam welding step according to a conventional method for making a tank.

SUMMARY OF THE INVENTION

The object of this invention is to provide a tank and a method for making the tank in which a flange of an upper shell and a flange of a lower shell need not be spot-welded for the purpose of provisional fixing before they are seam-welded.

According to this invention, a flange of an upper shell of a tank is matched with a flange of a lower shell of the tank by means of plural projections which are formed on one of the flanges in place of spot welding thereof. Such projections of one flange can be directly engaged with the outer periphery of the other flange or some recesses formed therein.

BRIEF DESCRIPTION OF THE DRAWINGS

FIGS. 7 and 8 are views similar to those of FIGS. 5 and 6, of a modified tank; FIGS. 9 and 10 are views similar to those of FIGS. 5 and 6, of still another embodiment of the invention.

DETAILED DESCRIPTION

Figure 5:
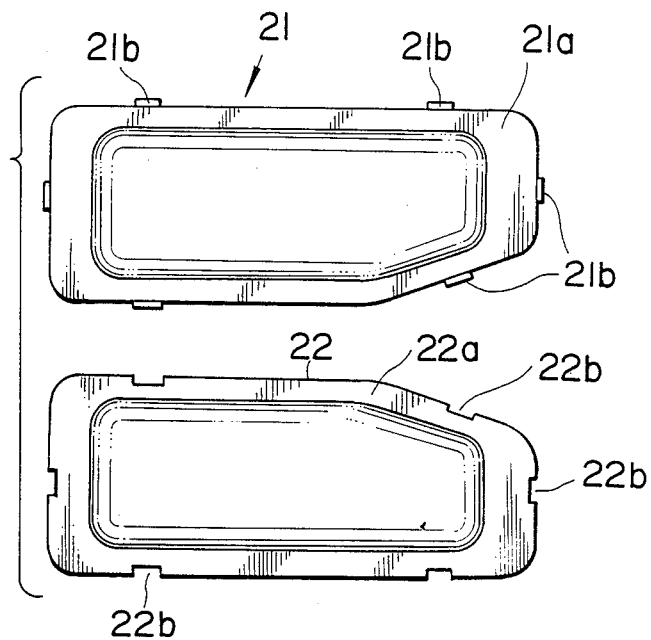
FIG. 5 shows a lower shell and an upper shell of a tank in a disassembled condition according to one embodiment of this invention.
Figure 6:
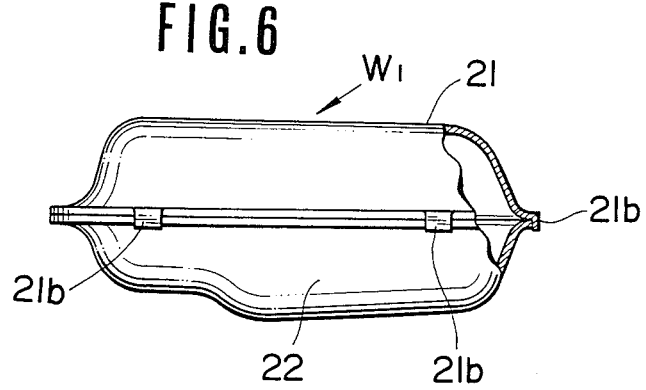
FIG. 6 is a front view showing, partly in section, the tank shown in FIG. 5 according to this invention, which can be produced by the seam welding machine as shown in FIGS. 3 and 4.

Referring now to FIGS. 5 and 6, a tank W1 has an upper shell 21 and a lower shell 22. The upper shell 21 has a flange 21a at its outer periphery. A plurality of nail-shaped projections 21b are formed at the outer periphery of the flange 21a. The projections 21b extend downwardly to some minor degree as best shown in FIG. 6. The number and position of the projections 21b of the upper shell 21 can be selected so as to prevent the lower shell 22 from moving in any lateral direction. The lower shell 22 has a flange 22a at its outer periphery. The flange 21a of the upper shell 21 is substantially in agreement with the flange 22a of the lower shell 22. A plurality of recesses 22b are formed at the outer periphery of the flange 22a of the lower shell 22. The recesses 22b exactly correspond in position to those of the projections 21b so that the projections 21b and the recesses 22b can fit together when the upper and lower shells are assembled.

It is preferable that the upper shell 21 and the projections 21b are formed by pressing and then trimmed before the projections are bent. It is also preferable that the lower shell 22 and the recesses 22b are formed by pressing and then trimmed.

Figure 1:
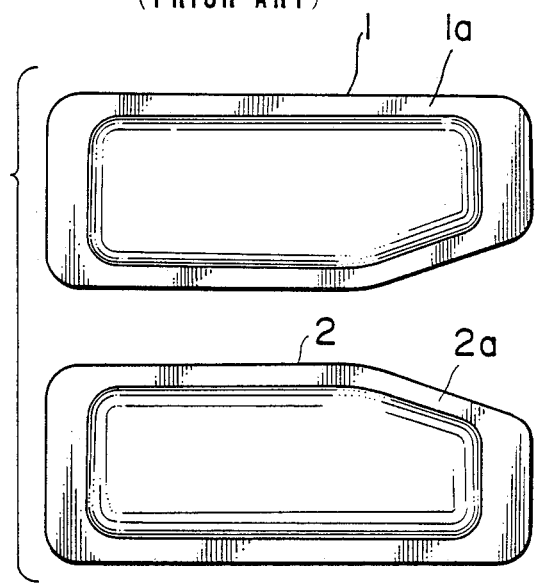
FIG. 1 shows a conventional tank having an upper shell and a lower shell in a disassembled condition.
Figure 2:
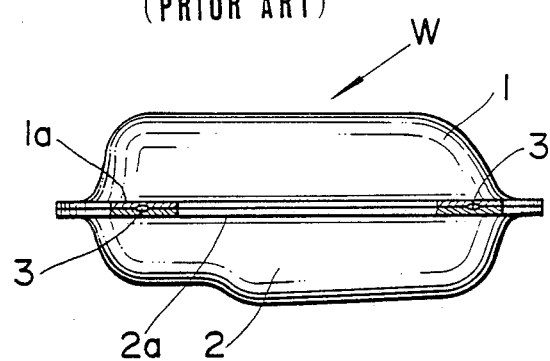
FIG. 2 is a front view of the prior art tank in an assembled condition.
Figure 3:
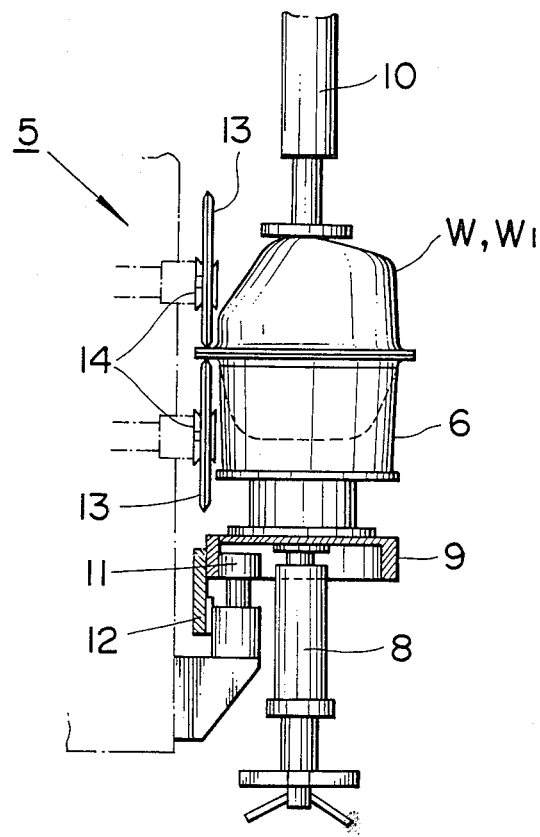
FIG. 3 is a schematic view showing a conventional seam welding machine.
Figure 4:
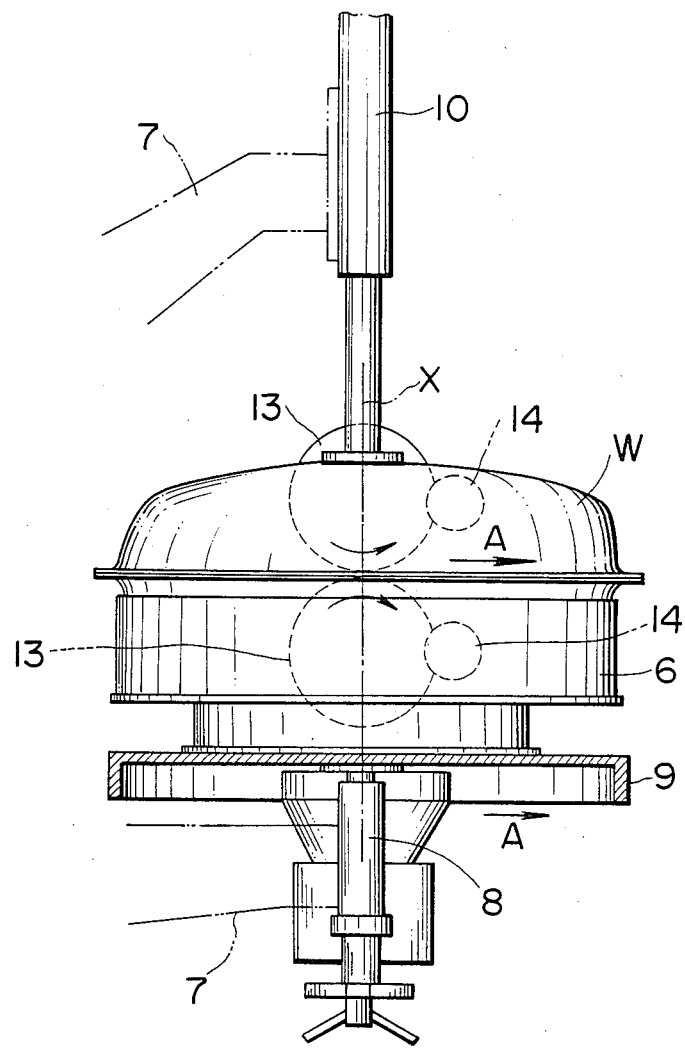
FIG. 4 is a side view showing an essential portion of the seam welding machine shown in FIG. 3.

The upper shell 21 and the lower shell 22 are assembled and welded as follows:

The projections 21b of the upper shell 21 and the recesses 22b of lower shell 22 fit together so that the upper shell 21 and the lower shell 22 are assembled as shown in FIG. 6 thereby to form the tank W1. The tank W1 which has not yet been welded is placed on the work receiver 6 as shown in FIG. 3. The flanges 21a and 22a are pressed between the pair of roller electrodes 13. Thereafter, the flanges 21a and 22b are seam-welded by means of the seam welding machine 5 (FIG. 3).

When the flanges 21a and 22a rotate in response to the rotation of the roller electrodes 13, the flanges 21a and 22a are seam-welded. At that time, the displacement of the flanges 21a and 22a can be avoided although the profile of the profiling cam 9 strongly affects the movement of the flanges 21a and 22a. It is because the projections 21b of the flange 21a and the recesses 22b of the flange 22a fixedly fit together.

In a further mode of this invention, the projections can be formed on the lower shell 22 and the recesses can be formed in the upper shell 21. In another mode of this invention, projections 21d, 22d and recesses 21e, 22e can be formed at both the upper shell 21 and the lower shell 22 (FIGS. 7 and 8).

If the number of the projections 21b is reasonably large, the recesses can be omitted. In such a case, the projections 21b of the upper shell 21 directly engage a smooth outer periphery of the flange 22a of the lower shell 22 (FIGS. 9 and 10).

According to this invention, the upper shell and the lower shell can be fixedly held in a predetermined condition during a seam welding step by means of the projections of one flange. Therefore, no spot-welding for the purpose of avoiding the displacement of the two flanges is required. As a result, the time of welding a tank can be decreased. Also, a spot welding machine is not required.

What is claimed is:

1. A method of making a tank, comprising of:
   pressing a sheet material to form a first half shell having a first flange along an entire outer periphery thereof and a plurality of first projections each extending outwardly from an outer peripheral edge of the first flange in a plane including the first flange;
   bending said first projections so as to be directed perpendicular to said plane;
   pressing a sheet material to form a second half shell having along an entire outer periphery thereof a second flange corresponding in shape to the first flange;
   matching the first and second flanges so as to form a tank shape;
   engaging said first projections with the second flange, thereby to fix provisionally the first and second flanges in a matched condition; and
   seam-welding the first and second flanges to each other along the outer peripheries of said first and second flanges.

2. A method of making a tank as claimed in claim 1, wherein the step of forming the second half shell includes forming a plurality of cutouts at the outer periphery of the second flange, said cutouts corresponding in position to said first projections, and the step of engaging said first projections with the second flange comprises engaging said first projections with said cutouts of the second flange.

3. A method of making a tank as claimed in claim 1, wherein the step of forming the first half shell includes forming a plurality of first cutouts at the outer periphery of the first flange; the step of forming the second half shell includes forming a plurality of second projections and second cutouts at the outer periphery of the second flange, said second projections each extending outwardly from the outer peripheral edge of the second flange in a plane including the second flange, said second projections and said second cutouts corresponding in position to the first cutouts and the first projections, respectively; and the step of engaging the first projections with the second flange comprises engaging the first projections and the first cutouts with the second cutouts and the second projections, respectively.

* * * * *